(12) United States Patent
Sacchi et al.

(10) Patent No.: US 9,718,040 B2
(45) Date of Patent: Aug. 1, 2017

(54) SYSTEM FOR PREPARING RECIPES WITH COMPONENTS COMING FROM CLOSED CONTAINERS

(71) Applicant: F.LLI SACCHI DI SACCHI ANGELO E C. S.N.C., Vidigulfo (IT)

(72) Inventors: Luigi Sacchi, Vidigulfo (IT); Massimiliano Sacchi, Vidigulfo (IT)

(73) Assignee: F.LLI SACCHI DI SACCHI ANGELO E C. S.N.C., Vidigulfo (IT)

( * ) Notice: Subject to any disclaimer, the term of this patent is extended or adjusted under 35 U.S.C. 154(b) by 0 days.

(21) Appl. No.: 14/902,607

(22) PCT Filed: Jul. 18, 2013

(86) PCT No.: PCT/IB2013/055919
§ 371 (c)(1),
(2) Date: Jan. 4, 2016

(87) PCT Pub. No.: WO2015/001398
PCT Pub. Date: Jan. 8, 2015

(65) Prior Publication Data
US 2016/0166998 A1    Jun. 16, 2016

(30) Foreign Application Priority Data
Jul. 4, 2013   (EP) .................................... 13175004

(51) Int. Cl.
*B01F 15/04*   (2006.01)
*B65G 65/30*   (2006.01)
(Continued)

(52) U.S. Cl.
CPC .......... *B01F 15/0235* (2013.01); *B01F 3/188* (2013.01); *B01F 13/1005* (2013.01);
(Continued)

(58) Field of Classification Search
CPC ... B65B 69/00; B65B 69/008; B65B 69/0022; B65B 69/0008; B65B 69/0033;
(Continued)

(56) References Cited

U.S. PATENT DOCUMENTS 3,724,721 A      4/1973   Barr
3,937,342 A  *   2/1976   Ittner ...................... B65B 69/00
                                                    198/457.05

(Continued)

FOREIGN PATENT DOCUMENTS

DE          94054568         6/1994
DE       102006061818 A      6/2008
(Continued)

OTHER PUBLICATIONS

Search Report and Written Opinion of PCT/IB2013/055919 of Dec. 6, 2013.

*Primary Examiner* — Andrew J Triggs
(74) *Attorney, Agent, or Firm* — Silvia Salvadori, P.C.; Silvia Salvadori

(57) ABSTRACT

A system for preparing recipes with components coming from closed containers (S1-S5) provides for using one or more robotic units (1), each of which withdraws a selected container, arranging a plurality of hoppers (7.1-7.5), in each of which the withdrawn selected container is inserted by the robotic unit (1), and in each of which the container is automatically opened for loading the component into the hopper (7), discharging a preset component dose from each hopper (7), and collecting the dosed components for preparing the required recipe; a driving and control unit (15) provides for driving and controlling all of these operations as a function of the required recipe. Thereby, an automatic (Continued)

system for preparing recipes is achieved, which is fast, with a low processing cost, and free from risks related to the processing.

4 Claims, 3 Drawing Sheets

(51) Int. Cl.
*B01F 13/00* (2006.01)
*B01F 15/02* (2006.01)
*B65B 69/00* (2006.01)
*B01F 13/10* (2006.01)
*B01F 15/00* (2006.01)
*B01F 3/18* (2006.01)
*B65G 65/00* (2006.01)
*B65G 65/32* (2006.01)
*B65G 65/40* (2006.01)
*B01F 7/02* (2006.01)

(52) U.S. Cl.
CPC ...... *B01F 13/1066* (2013.01); *B01F 13/1069* (2013.01); *B01F 15/00253* (2013.01); *B01F 15/0445* (2013.01); *B65B 69/00* (2013.01); *B65B 69/0008* (2013.01); *B65B 69/0033* (2013.01); *B65G 65/005* (2013.01); *B65G 65/32* (2013.01); *B65G 65/40* (2013.01); *B01F 7/02* (2013.01); *B01F 2215/0013* (2013.01)

(58) Field of Classification Search
CPC .............. B01F 15/0235; B01F 13/1069; B01F 15/00253; B01F 13/1066; B01F 3/188; B01F 13/1005; B01F 15/0445; B65G 65/005; B65G 65/32; B65G 65/40; B65G 69/0008
USPC ..... 414/288, 304, 411, 416.01; 53/235, 237, 53/266.1, 285, 502–504, 75, 240, 381.1; 700/213–230
See application file for complete search history.

(56) References Cited

U.S. PATENT DOCUMENTS

| 4,544,279 | A | * | 10/1985 | Rudolph | B01F 15/0445 177/70 |
|---|---|---|---|---|---|
| 5,775,852 | A | | 7/1998 | Boutte et al. | |
| 7,798,054 | B2 | * | 9/2010 | Evers | A47J 31/407 222/129.1 |
| 8,034,390 | B2 | * | 10/2011 | Sus | A47J 37/1228 426/233 |
| 8,784,915 | B2 | * | 7/2014 | Evers | A47J 31/407 220/203.08 |
| 2008/0148948 | A1 | * | 6/2008 | Evers | A47J 31/407 99/275 |
| 2009/0276091 | A1 | * | 11/2009 | Duha | B01F 13/1055 700/239 |
| 2010/0249991 | A1 | * | 9/2010 | Asano | B65G 47/5145 700/218 |
| 2010/0326283 | A1 | * | 12/2010 | Evers | A47J 31/407 99/295 |
| 2012/0005105 | A1 | * | 1/2012 | Beier | G06Q 10/06 705/303 |
| 2014/0290190 | A1 | * | 10/2014 | Morikawa | B65B 1/30 53/507 |
| 2016/0166998 | A1 | * | 6/2016 | Sacchi | B01F 13/1005 414/21 |

FOREIGN PATENT DOCUMENTS

| EP | 1090678 A1 | 4/2001 |
|---|---|---|
| WO | 2006043261 A1 | 4/2006 |
| WO | 2011057392 A1 | 5/2011 |

* cited by examiner

SYSTEM FOR PREPARING RECIPES WITH COMPONENTS COMING FROM CLOSED CONTAINERS

This application is a U.S. national stage of PCT/IB2013/055919 filed on 18 Jul. 2013, which claims priority to and the benefit of European Application No. EP13175004.4 filed on 4 Jul. 2013, the contents of which are incorporated herein by reference in their entireties.

BACKGROUND OF THE INVENTION

The present invention relates to a system for preparing recipes with components coming from closed containers, such as sacks, boxes, tubs, etc.

STATE OF THE ART

In order to prepare recipes, for example, in the food field, a high manual efficiency is required.

For example, for preparing cereal cookies, multiple operators are required, who provide for withdrawing the sacks containing the various cereals, for opening the sacks, for dosing and mixing the various cereals.

It shall be apparent that this high manual efficiency involves prolonged processing times and high manufacturing costs.

Again, in the case of preparing recipes in the chemical field, the operator may be forced to handle toxic substances; therefore, he/she is subjected to risks to his/her health.

Furthermore, handling heavy sacks is an activity with a high risk to the operators, and in the case where the handling operations are frequent, it is an activity that is expressly forbidden by the law in force.

Lastly, the selection and dosing of the several components is demanded to the operator, whereby the risk of a human error always exists.

OBJECT OF THE INVENTION

The object of the present invention is to obviate the above-mentioned limitations in manual efficiency.

BRIEF DESCRIPTION OF THE INVENTION

Such an object is achieved by a system for preparing recipes with components coming from closed containers in accordance with claim 1.

BRIEF DESCRIPTION OF THE DRAWINGS

In order to better understand the invention, a description of an exemplary, no-limiting embodiment thereof is set forth herein below, illustrated in the appended drawings, in which.

DETAILED DESCRIPTION OF THE INVENTION

Figure 1:
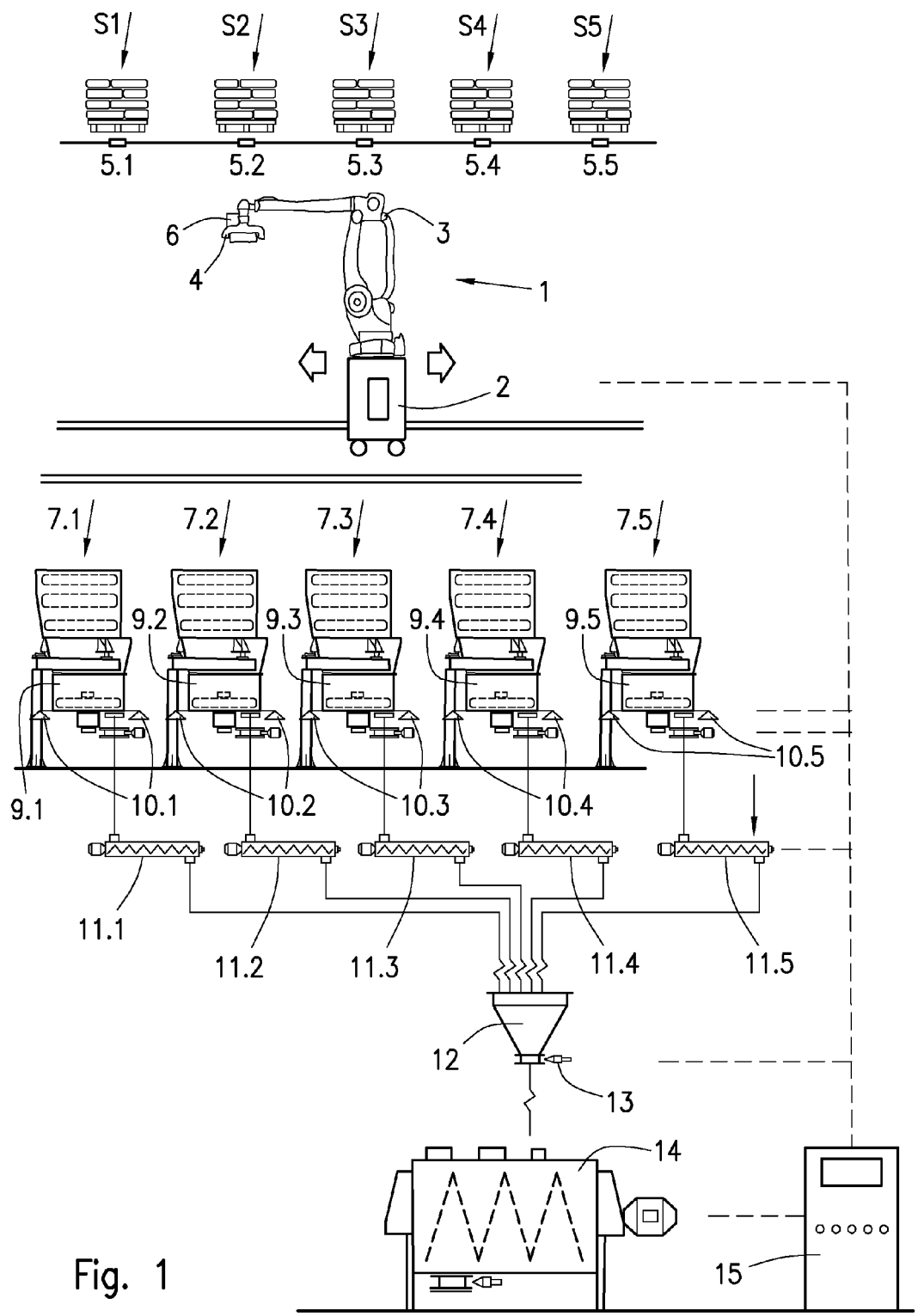
FIG. 1 shows a diagram of a system for preparing recipes with components coming from closed containers according to the invention.

First, five groups of sacks S1,S2,S3,S4,S5 are shown by way of example in FIG. 1, each group being composed of a plurality of sacks orderly stacked on pallets. The sacks of each group contain a given component, which is different from that of the other sacks, so as to be able to prepare recipe with five different components contained in the sacks.

At the groups of sacks a robotic unit 1 operates, which is essentially formed by a cart 2 mobile along a horizontal plane (as indicated by the arrows), an articulated arm 3 mounted on the mobile cart 2, and a pneumatic gripping head 4 mounted at the end of the arm 3.

A system for aligning the robotic unit 1 with the groups of sacks is provided. For example, five physical references 5.1,5.2,5.3,5.4,5.5 may be provided, each at a corresponding one of the groups of sacks S1-S5 at which each group of sacks is arranged, for example, by a forklift truck. The head 4 of the robotic unit 1 may be provided with an optical/electronic device for recognizing sacks, for example, by laser scanning or the like, indicated by 6.

Figure 3:
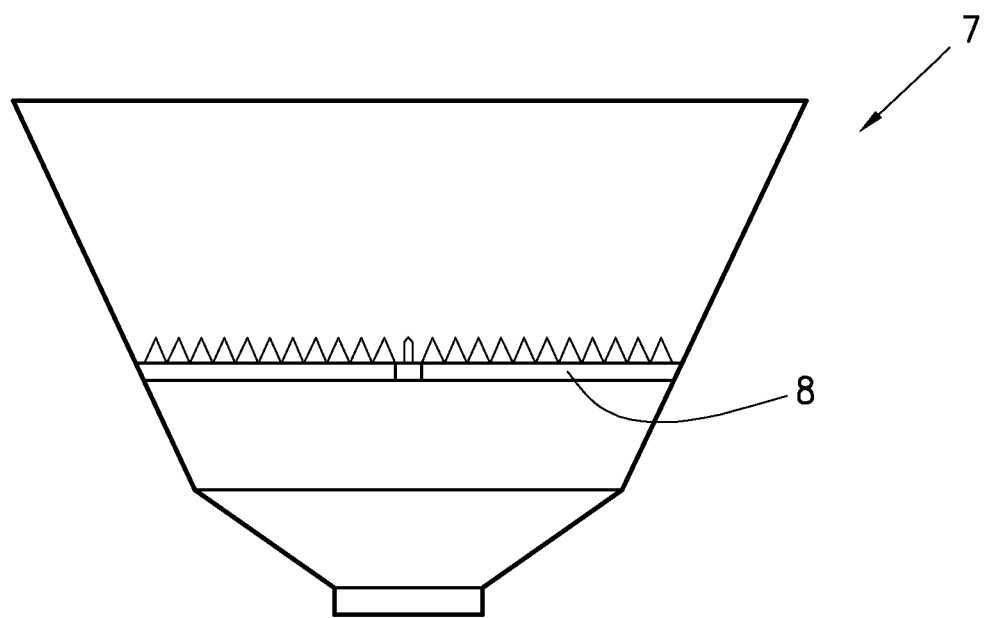
FIG. 3 shows a component of the system of FIG. 1.

A series of five hoppers 7.1,7.2,7.3,7.4,7.5 is provided downstream of the robotic unit 1. As shown in FIG. 3, each hopper 7 has a cutting device inside, which is formed by toothed cutting blades 8 angularly adjustable, with teeth facing vertically towards the hopper mouth.

Five corresponding extractors 9.1,9.2,9.3,9.4,9.5 are mounted below the five hoppers 7.1-7.5.

Each hopper-extractor unit is mounted on loading cells detecting the weight of the same unit. The cells are indicated with 10.1,10.2,10.3,10.4,10.5, respectively.

Five screw conveyors, connected to the extractors 9.1-9.5, which are indicated with 11.1,11.2,11.3,11.4,11.5, respectively, are provided for downstream of the hopper-extractor units.

The screw conveyors 11.1-11.5 are connected downstream to a single collecting hopper 12.

A screw extractor 13 is mounted below the hopper 12.

The extractor 13 is in turn connected downstream to a horizontal mixer 14.

Finally, an electronic driving and control unit 15 is provided, connected to the robotic unit 1, the extractors 9.1-9.5, the loading cells 10.1-10.5, the screw conveyors 11.1-11.5, the extractor 13, and the mixer 14. A pre-arranged electronic mapping is provided in such unit 15, which mapping allows the unit 15 directing the robotic unit 1 towards the selected group of sacks, then towards the sack to be withdrawn; the unit 15 may use, for the electronic mapping or the localization of the sacks, the electronic recognition device 6 on board of the robotic unit 1.

The system for preparing recipes described above operates as follows.

The driving and control unit 15, on the basis of the required recipe, moves along the horizontal plane the robotic unit 1, which provides to withdraw the sacks with the components of interest for the recipe.

If, for example the recipe provide for the use of the components present in the sacks S1,S3,S5, the robotic unit 1 will initially align with the group of sacks S1. At this point, the arm 3 is actuated, which moves the pneumatic gripping head to bring it at one of the sacks of the group S1. The head withdraws by suction the sack of the group S1 and inserts it into the hopper 7.1. At the same manner, a sack of the group S3 is withdrawn by the robotic unit 1 and it is inserted in the hopper 7.3; then a sack of the group S5 is withdrawn and inserted into the hopper 7.5.

When the robotic unit 1 inserts the sack of the group S1 into the hopper 7.1, the cutting blades 8 in the proximity of the hopper bottom provide to cut the sack so as to completely discharge its contents. The hopper 7.1 is thus filled with the component relative to the group of sacks S1. Next, in the same manner, the hopper 7.3 is filled with the component relative to the group of sacks S3, and the hopper 7.5 is filled with the component relative to the group of sacks S5.

The loading cells 10.1,10.3,10.5 provides to the driving and control unit 15 the weight data of the components contained in the hoppers 7.1,7.3,7.5, so that the robotic unit 1 is able to fill the hoppers until reaching the maximum weight, or until ensuring the required dosing.

At this point, the unit 15 actuates the extractors 10.1,10.3, 10.5 and the screw conveyors 11.1,11.3,11.5 based on the dosings required by the recipe, so that the three components that are present in the hoppers 7.1,7.3,7.5 all arrive to the collection hopper 12, each in the required dosing. In order to calculate the dosing, the unit 15 uses the loading cells 10.1,10.3,10.5, which allow determining the withdrawal value by weight of each component.

Once the three components have been loaded in the collection hopper 12, the unit 15 actuates the extractor 13 so that the three components flow into the mixer 14, and then it actuates the mixer, providing to mix the three components, which are then sent to successive processing operations.

It shall be apparent that, by the same method, recipes with two, four, or five components may be prepared.

Figure 2:
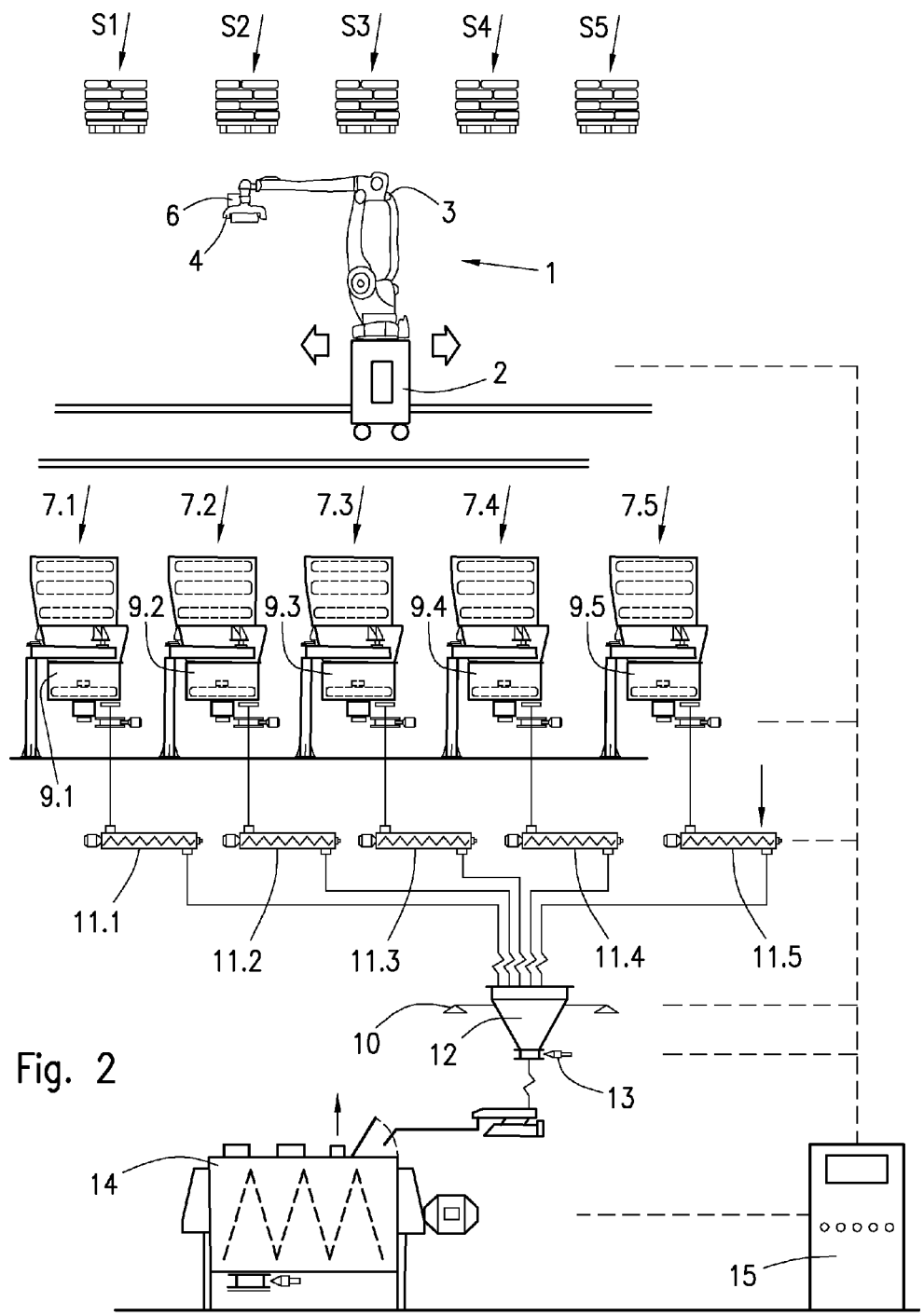
FIG. 2 shows the system of FIG. 1 in an implementation variant.

In FIG. 2, the same system of FIG. 1 is shown, with the difference that only one loading cell 10 is provided relative to the collection hopper 12, while the hoppers 7.1-7.5 are without loading cells. In this case, the dosing may be carried out only in the collection hopper 12, by loading therein one component at a time and weighting it by the loading cell 10. The hoppers 7.1-7.5 are filled until reaching a preset level.

The system described for preparing recipes with components coming from sacks is completely automatic.

This involves short processing times and low processing costs.

In addition, in the case of preparing recipes with toxic product, the health risks to the people are eliminated, due to the absence of operators.

Finally, also the risk of handling heavy sacks is eliminated.

Among other things, all the handling operations, thus what has been loaded, may be tracked in a memory of the electronic driving and control unit 15.

The system of FIG. 1, providing a weighting operation in parallel of the components, is quicker, but more expensive, while the system of FIG. 2, providing a weighting operation in series of the components, is less quick, but less expensive.

It shall be apparent that a number of variations and/or addition to what has been described and illustrated may be provided.

The system may be applied to any type of automatically openable container in the component containment hopper.

The number of the components for preparing the recipe may be any. Of course, the number of hoppers, extractors, screw conveyors, etc., may vary.

The pneumatic gripping head of the robotic unit will be able to be replaced by a mechanical gripping head.

Multiple robotic units operating in parallel may be used, so as to speed up the processing times, even if, of course, the costs the will be higher.

The toothed blades in the hoppers may be arranged horizontally rather than facing upwardly, or they may be replaced by other cutting devices having an equivalent function.

The components, rather than being weighted in the hoppers, will be able to be weighted in the mixer, which will be provided with suitable loading cells.

The cutting hoppers will be able to supply precision dispensers.

In the place of the mixer, a palletized container or a continuous extruder will be able to be used; generally, a continuous or discontinuous processing device will be able to be used, or a container for intermediate products.

The dosing will be able to be carried out according to the whole number of sacks, and not according to the weight.

Other devices for extracting and adjusting the component flow will be able to be used from those illustrated above.

Other elements will be able to be added to the described and illustrated system, which is simplified. For example a device for compacting empty sacks will be able to be provided, there could be supplying units directly connected to the mixer to add secondary doses of other components, compensation hoppers and/or other hoppers will be able to be provided. Screens and material detectors will be able to be inserted on the product flow.

The invention claimed is:

1. A system for preparing recipes with components coming from closed containers, said system comprising:
    one or more robotic units, each being provided with withdrawal means for a selected container; said one or more robotic units being essentially formed by a mobile cart, an articulated arm mounted on the mobile cart and a pneumatic gripping head mounted at the end of the arm;
    a plurality of hoppers, each having a mouth, said plurality of hoppers being provided downstream of said one or more robotic units, each of said plurality of hoppers having inside a cutting device which is formed by toothed cutting blades angularly adjustable, with teeth facing vertically towards the hopper mount, in each of said plurality of hopper a withdrawn selected container being inserted by the robotic unit, each hopper comprising automatic container opening means for loading the component into the hopper;
    discharging means of a preset component dose from each hopper;
    collection means of the dosed components;
    a driving and control unit, connected to the robotic units, the discharging means, and the collection means to drive and control the withdrawal of the containers, the dosing of the components, and the collection of the components as a function of the required recipe, wherein the containers are arranged in groups, the containers of each group containing a given component, which is different from that of the other containers, so as to be able to prepare said recipe with different components contained in the containers,
    an arrangement for aligning the robotic unit with the groups of containers,
    wherein the driving and control unit and the robotic unit comprise an optical/electronic device for recognizing the containers.

2. The system according to claim 1, wherein each hopper comprises a weighting device connected to the driving and control unit, to weight the component in the hopper and to establish the component dose as a function of the required recipe.

3. The system according to claim 1, wherein the collection means comprise a collection hopper comprising a weighting device connected to the driving and control unit, to weight the component in the collection hopper and to establish the component dose as a function of the required recipe.

4. The system according to claim 1, wherein the driving and control unit comprises a memory to store all handling operations carried out by the system.

\* \* \* \* \*